United States Patent
Gangadharan et al.

(10) Patent No.: US 11,290,469 B2
(45) Date of Patent: Mar. 29, 2022

(54) METHODS AND APPARATUS TO DETECT AND PREVENT HOST FIREWALL BYPASS THREATS THROUGH A DATA LINK LAYER

(71) Applicant: McAfee, LLC, Santa Clara, CA (US)

(72) Inventors: Suresh Gangadharan, Bangalore (IN); Sriranga Seetharamaiah, Bangalore (IN)

(73) Assignee: MCAFEE, LLC, Santa Clara, CA (US)

( * ) Notice: Subject to any disclaimer, the term of this patent is extended or adjusted under 35 U.S.C. 154(b) by 171 days.

(21) Appl. No.: 16/453,714

(22) Filed: Jun. 26, 2019

(65) Prior Publication Data

US 2020/0120111 A1 Apr. 16, 2020

(30) Foreign Application Priority Data

Oct. 11, 2018 (IN) .............................. 201841038559

(51) Int. Cl.
*H04L 29/06* (2006.01)

(52) U.S. Cl.
CPC ...... *H04L 63/1416* (2013.01); *H04L 63/0227* (2013.01); *H04L 63/164* (2013.01); *H04L 63/166* (2013.01)

(58) Field of Classification Search
CPC ... G06F 21/554; H04L 63/162; H04L 63/164; H04L 63/166; H04L 63/0227; H04L 63/1416
USPC ........................................................ 726/13
See application file for complete search history.

(56) References Cited

U.S. PATENT DOCUMENTS

| | | | |
|---|---|---|---|
| 8,028,160 | B1 | 9/2011 | Orr |
| 8,479,285 | B2 * | 7/2013 | Moyle ..................... G06F 21/55 726/22 |
| 9,398,035 | B2 * | 7/2016 | Vasseur ............... H04L 63/1441 |
| 2003/0182580 | A1 | 9/2003 | Lee |
| 2005/0037733 | A1 | 2/2005 | Coleman et al. |

FOREIGN PATENT DOCUMENTS

| | | |
|---|---|---|
| CN | 1435977 A | 8/2003 |
| JP | 2005260612 A | 9/2005 |
| KR | 1020020085053 A | 11/2002 |

OTHER PUBLICATIONS

Preventing Layer 2 security threats By John Bartlomiejczyk and Marcus Phipps, Cisco Systems https://www.techtarget.com/searchnetworking/tip/Preventing-Layer-2-security-threats (Year: 2004).*
International Searching Authority, "International Search Report," dated Jan. 10, 2020 in connection with International Patent Application No. PCT/US2019/052983, 3 pages.
International Searching Authority, "Written Opinion," dated Jan. 10, 2020 in connection with International Patent Application No. PCT/US2019/052983, 4 pages.

* cited by examiner

*Primary Examiner* — Benjamin A Kaplan
(74) *Attorney, Agent, or Firm* — Hanley, Flight & Zimmerman, LLC

(57) ABSTRACT

A disclosed apparatus includes a connection detector to detect a communication as including a request to connect to a device at a data link layer of an Open Systems Interconnection model; a threat monitor to determine whether the communication is a threat; and a threat manager to, when the threat monitor determines the communication is a threat, at least one of generate a notification to prompt a user about the threat or block the communication.

20 Claims, 7 Drawing Sheets

METHODS AND APPARATUS TO DETECT AND PREVENT HOST FIREWALL BYPASS THREATS THROUGH A DATA LINK LAYER

RELATED APPLICATIONS

This application claims the benefit of Indian Provisional Patent Application No. 201841038559, filed Oct. 11, 2018, and entitled "Methods and Apparatus to Detect and Prevent Host Firewall Bypass Threats Through A Data Link Layer." Indian Provisional Patent Application No. 201841038559 is hereby incorporated herein by reference in its entirety.

FIELD OF THE DISCLOSURE

The present disclosure relates generally to network-based computing and, more particularly, to methods and apparatus to detect and prevent host firewall bypass threats through a data link layer.

BACKGROUND

Endpoint devices such as computers, servers, mobile phones, tablet computing devices, wearable technologies, Internet appliances, etc. receive communications to access resources across one or more layers of a network stack (e.g., a network stack implemented in accordance with an Open Systems Interconnection model (OSI model)). Such communications can be used by malicious applications to gain unwanted or unauthorized access to endpoint devices. Network administrators can deploy host firewalls across endpoint devices to monitor communications that connect at a transport layer (Layer 4) and/or a network layer (Layer 3) of a network stack to detect and/or prevent threats at those layers.

Figure 1:
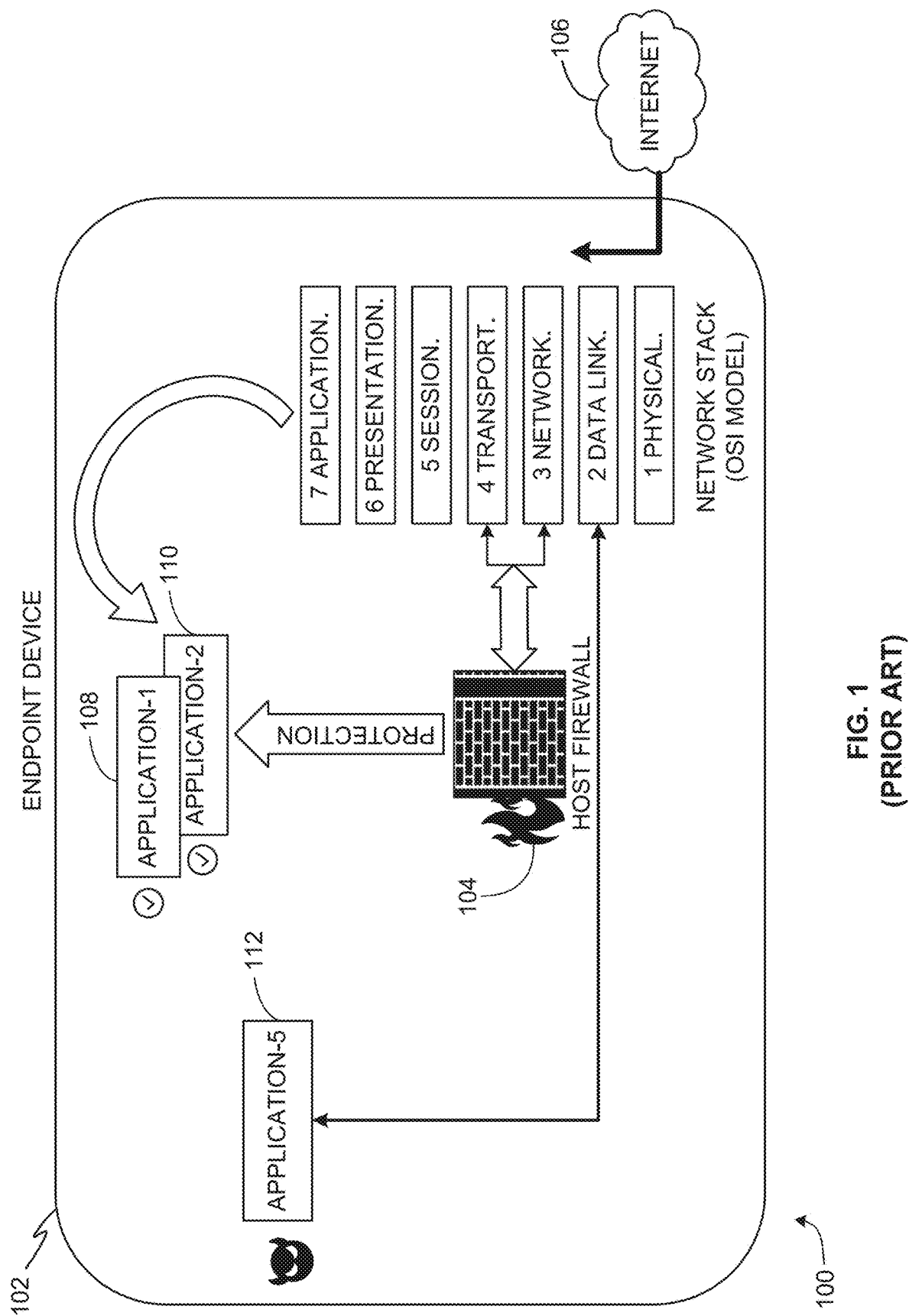
FIG. 1 is a prior firewall protection configuration in an endpoint device that monitors communications at a transport layer (Layer 4) and a network layer (Layer 3) of an Open Systems Interconnection model (OSI model).

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Examples disclosed herein may be used to detect and prevent attacks that bypass host firewall protections by connecting and communicating via a data link layer. A data link layer is known as Layer 2 of a network stack that operates in accordance with an Open Systems Interconnection model (OSI model). The OSI model is a hierarchical standard for organizing different levels involved in computer-based network communications. The OSI model includes seven layers which include a physical layer (Layer 1), a data link layer (Layer 2), a network layer (Layer 3), a transport layer (Layer 4), a session layer (Layer 5), a presentation layer (Layer 6), and an application layer (Layer 7). Typically, devices are identified based on their physical addresses at the data link layer (Layer 2). As such, a connection to a device at the data link layer (Layer 2) is based on a media access control (MAC) address of the device because the MAC address is the physical address of the device. However, at the network layer (Layer 3) and the transport layer (Layer 4), devices are identified based on logical addresses. For example, a connection to a device at the network layer (Layer 3) is based on an internet protocol (IP) address, and at the transport layer (Layer 4) a particular process is assigned a port address via which data corresponding to that process flows.

Communications at the data link layer (Layer 2) may be used by processes to communicate directly with devices based on MAC addresses while avoiding the IP of the network layer (Layer 3) and the transport control protocol (TCP) of the transport layer (Layer 4). Processes may use this to, for example, employ a custom protocol (e.g., instead of TCP/IP), communicate directly with hardware, improve communication efficiency (e.g., avoiding Layer 3 and Layer 4 overhead), and/or for other reasons. Processes may request connections at the data link layer (Layer 2) by issuing communications that include application programming interface (API) calls (e.g., calls made to an API) and/or that include requests for raw socket connections. For an API call, a process sends a request to an API through a connection request function call defined in the API. For a raw socket connection, a process requests creation of a raw socket at the data link layer (Layer 2). An example raw interface for establishing a raw socket connection is the Berkley Packet Filter (bpf), which provides a raw interface to the data link layer (Layer 2) in a protocol-independent fashion, and can be invoked by issuing a file open request to a /dev/bpf0 character file. A file open request to /dev/bpf0, opens access to a character device (e.g., "/dev") at the data link layer (Layer 2) using a bpf raw socket interface. The character device instance enables directly writing to buffers of hardware via the data link layer (Layer 2). In some examples, all packets on a network are accessible through a bpf raw socket connection.

Threats in the form of communications to carry out intentional malicious attacks or unintentional erroneous accesses may occur at one or more of the seven layers of the OSI model. For example, turning to FIG. 1, a prior firewall protection configuration 100 in an endpoint device 102 includes a host-based firewall 104 which is a well-known protection service that operates at the transport layer (Layer 4) and at the network layer (Layer 3) of a network stack structured in accordance with the OSI model to monitor for and manage threats at those layers. In FIG. 1, the firewall 104 monitors communications exchanged between the endpoint device 102 and other devices connected via a network 106 such as the Internet. The firewall 104 protects against malicious, unwanted, and/or unauthorized communications corresponding to Application-1 108 and Application-2 110. However, some malicious software can work at the data link layer (Layer 2) of the OSI model and bypass firewall rules because such firewall rules are designed to operate at the transport layer (Layer 4) and/or the network layer (Layer 3). Such an example of malicious software is shown in FIG. 1 as Application-5 112, which operates at the data link layer (Layer 2) to bypass the protective firewall rules of the firewall 104. Examples disclosed herein implement an intrusion prevention mechanism that detects threats operating at the data link layer (Layer 2). Such threats may be intentional attempts at bypassing host firewall rules by operating at the data link layer and/or may be unintentional consequences of poorly written/executed programs that perform harmful operations at the data link layer.

Figure 2:
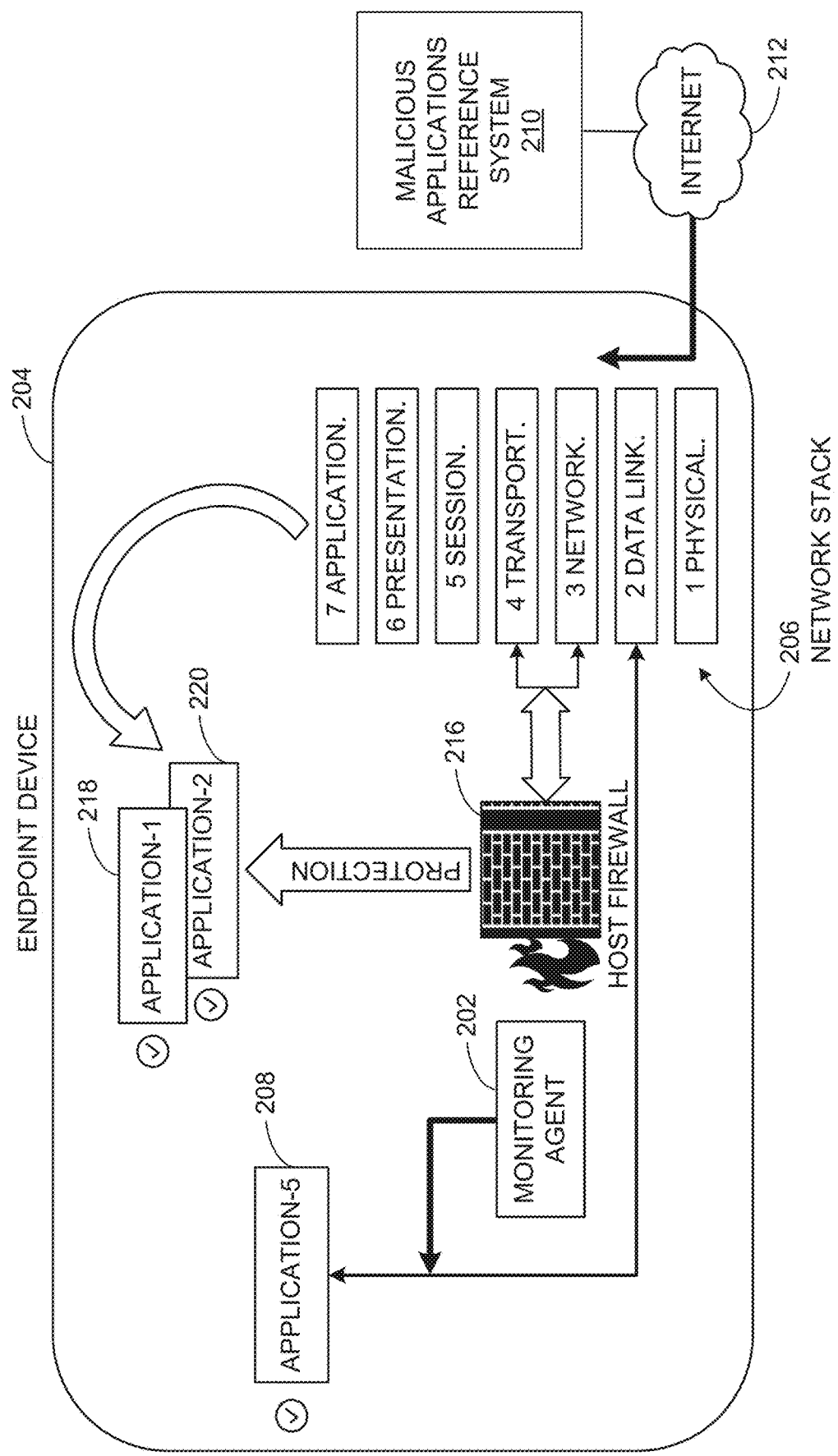
FIG. 2 depicts an example monitoring agent implemented in accordance with teachings of this disclosure to monitor communications at a data link layer (Layer 2) of the OSI model and protect against threats in one or more of the monitored communications.

FIG. 2 depicts an example monitoring agent 202 executing in an example endpoint device 204. The example endpoint device 204 may be any type of computing device such as a server computer, a desktop computer, a laptop computer, a tablet computer, a mobile phone, virtual machines, containers, an Internet appliance, etc. Example Internet appliances include smart televisions, connected audio/video entertainment devices, connected household appliances (e.g., kitchen appliances, laundry appliances, home security systems, home lighting systems, etc.), etc. The example monitoring agent 202 is implemented in accordance with teachings of this disclosure to monitor communications at a data link layer (Layer 2) of an example network stack 206 implemented in accordance with the OSI model. When the example monitoring agent 202 detects a potential threat in a monitored communication at the data link layer (Layer 2), the monitoring agent 202 performs one or more protective actions to protect the endpoint device 204 against the potential threat. For example, the monitoring agent 202 may generate a notification to prompt a network administrator and/or a user about the threat. For example, the monitoring agent 202 may generate and send a threat alert notification to a threat management console (e.g., a McAfee Management Console—ePO (e-Policy Orchestrator)) accessible by a network administrator. The notification may be presented on a display (e.g., a computer display, a mobile phone display, a tablet display, etc.) for viewing by a user (e.g., a network administrator). In such examples, the monitoring agent 202 blocks the threat in response to user-input responsive to the notification in which the user input requests the communication to be blocked. In some examples, blocking the threat involves ending a process that created the threat.

In some examples, the monitoring agent 202 automatically blocks the threat without user input after the detection of the threat. For example, the monitoring agent 202 may automatically block a communication and/or end a corresponding process so that the process is stopped from carrying out the potential threat. The monitoring agent 202 may then generate a notification to inform a network administrator and/or a user about the threat activity. For example, the monitoring agent 202 may generate and send a threat alert notification to the threat management console (e.g., a McAfee Management Console—ePO (e-Policy Orchestrator)) accessible by a network administrator. In examples of automatically blocking threats, a configuration file may be used to store a setting or settings that cause(s) the monitoring agent 202 to automatically perform one or more responsive actions in response to one or more types of detected threats without user input after detecting such threat(s). Such settings in the configuration file may be default settings established during installation of the monitoring agent 202. Additionally or alternatively one or more settings of the configuration file may be set to user-specified values/actions provided by a user during or after the installation of the monitoring agent 202.

The monitoring agent 202 monitors processes executing in the endpoint device 204 that connect and/or try to connect via the data link layer (Layer 2). Examples disclosed herein are applicable for monitoring processes attempting to establish connections at the data link layer (Layer 2) using any suitable technique for detecting such requested connections. For example, some example connection request detection techniques include detecting when processes request connections at the data link layer (Layer 2) by issuing communications that include API calls (e.g., calls made to an API) and/or that include raw socket connection requests.

In FIG. 2, the monitoring agent 202 monitors communications from processes of an Application-5 208. In some examples, the monitoring agent 202 can detect suspicious activity that presents a potential threat by monitoring communications from processes of the Application-5 208 requesting to connect at the data link layer (Layer 2). Such detection at the initial connection request is based on the monitoring agent 202 checking privilege levels and/or trust levels of applications, and/or based on checking whether such applications are known to be suspicious or malicious. In examples disclosed herein, a suspicious application is an application that has been flagged as possibly contributing to threat activity but has not yet been confirmed. As such, an administrator policy may advise to block activities from suspicious applications. In examples disclosed herein, a malicious application is an application that has been confirmed being a threat. As such, an administrator policy may highly advise or require blocking activities from malicious applications.

To monitor privilege levels and/or trust levels, upon detecting a communication requesting to connect to the data link layer (Layer 2), the monitoring agent 202 can check the privilege levels and/or trust levels of a corresponding application in a privilege configuration file and/or a trust configuration file. Privilege levels define whether processes can access system-level information or only user-level information. Example privilege levels include a user-level access privilege and a system-level access privilege. A user-level access privilege prevents processes from accessing system-level files, configurations, etc. but allows access to user files. A system-level access privilege allows processes to access system-level files, configurations, etc. and to access user files. Trust levels define what operations different applications can and cannot perform based on their level of assigned trust. For example, some applications are trusted to connect at the data link layer (Layer 2) while other applications are not assigned such trust.

To check whether an application (e.g., the Application-5 208) is known to be suspicious or malicious, the example monitoring agent 202 detects such suspicious or malicious applications using one or more application cross-check data entities based on one or more application verification parameters corresponding to the application. Example application cross-check data entities are represented in FIG. 2 as an example malicious applications reference system 210 and store information indicative of applications known to be suspicious or malicious. Some example application cross-check data entities include an example threat database of known malicious files based on file checksums, an example anti-malware scanner engine based on known signatures of malicious files, a heuristics based engine to detect malicious files, and a machine learning (ML) based engine to detect malicious activities. Example application verification parameters include a checksum of a process file, a digital signature of the process file, a trace of the process file and of the network activities of the corresponding application, etc.

For example, the malicious applications reference system 210 may be implemented using a network-accessible cloud-based server that stores characteristics and metadata about malicious sources such as malicious applications, programs, websites, network communications, and/or processes. The example malicious applications reference system 210 may be implemented by a computing security entity such as a company or independent organization that monitors and tracks malicious activities reported by endpoint devices across a network such as the Internet 212. In some examples, a confirmation of a malicious source can be logged in the malicious applications reference system 210 when a threshold number of endpoint devices report erroneous or undesired operating conditions attributable to the malicious source. For example, when a program attempts an unauthorized access to a secure area in an endpoint device, the endpoint device reports the attempted access to the malicious applications reference system 210. The malicious applications reference system 210 can log the reporting and monitor for similar reportings from the same or other endpoint devices. In this manner, when a threshold number of reportings are logged, a ML process and/or a person (e.g., an administrator) can inspect the program responsible for the logged unauthorized access attempts to determine whether the program is actually a malicious source. Different criteria may be used to determine whether the program should be characterized as malicious. An example criterion is whether the origination of the program or the developer of the program is known to produce malicious programs. Another example criterion is whether the program spreads across the Internet 212 with a speed characteristic of virus-like infection and/or using delivery vehicles known to spread malicious activities (e.g., emails, email attachments, uniform resource locators (URLs), etc.). When the program is tagged or stored in a record of the malicious applications reference system 210 as a malicious source, the malicious applications reference system 210 also stores one or more application verification parameter(s) in association with the confirmed malicious source so that subsequent cross-checks for the presence of the malicious source at an endpoint device can be made based on the one or more application verification parameter(s).

In examples disclosed herein, an ML-based engine of the malicious applications reference system 210 to detect malicious activities is based on ML algorithms that analyze messages received from large quantities of endpoint devices indicative of possible threats corresponding to activities of different applications issuing connection requests on such endpoint devices. The ML algorithms perform pattern analysis on such messages and store reference application verification parameters in the malicious applications reference system 210 when threats for corresponding applications are confirmed. In the illustrated example of FIG. 2, the endpoint device 204 is in communication with the malicious applications reference system 210 via a network such as the Internet 212. In some examples, the entirety of and/or a portion of the malicious applications reference system 210 is cached in a memory of the endpoint device 204 for faster access and/or offline access by the monitoring agent 202. For example, a subset of entries from the malicious applications reference system 210 may be selected for local caching in a memory of the endpoint device 204 based on most relevancy to applications likely to be executed in the endpoint device 204. For example, if the endpoint device 204 is a tablet computer, it may cache entries from the malicious applications reference system 210 corresponding to mobile apps, whereas if the endpoint device 204 is a server, it may cache entries from the malicious applications reference system 210 corresponding to server programs, database applications, etc. In yet other examples, the malicious applications reference system 210 database is fully implemented and stored in the endpoint device 204.

In the illustrated example of FIG. 2, the example monitoring agent 202 queries the example malicious applications reference system 210 based on one or more application verification parameters of the Application-5 208 corresponding to the monitored process that sent the connection request. The query performs one or more comparisons and/or verifications between the one or more application verification parameters of the Application-5 208 and reference application verification parameters stored in the malicious applications reference system 210 that correspond to known malicious applications. When the comparison(s) and/or verification(s) corresponding to the query confirms a match and/or positive suspicious/malicious verification between the one or more application verification parameters of the Application-5 208 and reference application verification information of a known suspicious or malicious application, the monitoring agent 202 can perform one or more responsive actions to control (e.g., block, prompt a user about, etc.) the connection request and, thereby, protect the endpoint device 204 from the threat. In some examples, the monitoring agent 202 is structured to monitor ongoing connections at the data link layer (Layer 2) by monitoring communications from processes of applications (e.g., the Application-5 208) that have already established connections at the data link layer (Layer 2).

In some examples, the monitoring agent 202 obtains application verification parameters such as by generating a checksum of a process file based on an application ID of a monitored application (e.g., the Application-5 208) or extracting a digital signature from the process file. In such examples, the monitoring agent 202 compares checksums or digital signatures (e.g., application verification parameters) of monitored applications with reference checksums or reference digital signatures in the malicious applications reference system 210. In some examples, the monitoring agent 202 obtains an application ID of a monitored application by accessing a binary file of the monitored application in which the application ID resides. Such binary files are implemented differently across different operating system (OS) platforms. For example, the MAC OS stores application IDs in Mach object (Mach-O) files, the Windows OS stores application IDs in Portable Executable (PE) files, and the Linux OS stores application IDs in Executable and Linkable Format (ELF) files. Such binary files are typically stored in a system directory of the OS platform. The example monitoring agent 202 may generate a checksum value by calculating a checksum (e.g., using a message-digest (md5) hash algorithm, a SHA-1 hash algorithm (Secure Hash Algorithm 1), a SHA-2 hash algorithm (Secure Hash Algorithm 2), etc.) of the binary file and the application ID since the application ID is stored in the binary file. In addition, the example monitoring agent 202 may extract a digital signature corresponding to a process using any suitable technique (e.g., to extract the digital signature from the corresponding binary file that stores the application ID of the process). In such examples, when the monitoring agent 202 queries the malicious applications reference system 210 based on the checksum or digital signature, the query is based on the checksum value or digital signature of the binary file and the application ID. In such examples, the malicious applications reference system 210 processes the queries based on its stored reference application verification parameters such as reference checksum values or reference digital signatures of binary files and corresponding application IDs corresponding to known suspicious or malicious applications.

By performing threat monitoring at the data link layer (Layer 2) based on application verification parameters as described above, examples disclosed herein do not involve performing deep packet inspection. As such, the example monitoring agent 202 does not negatively impact performance of the endpoint device 204 in a significant manner as would occur if deep packet inspection were made on communications on the data link layer (Layer 2). That is, deep packet inspection involves buffering of data packets to access and inspect contents of payloads in those data packets, which significantly reduces data throughput. Accessing system binary files to generate application verification parameters (e.g., based on application IDs) of applications corresponding to processes requesting connections at the data link layer (Layer 2) as done in connection with examples disclosed herein does not involve such buffering and slowing of communications as done for deep packet inspection.

In the example of FIG. 2, an example host firewall 216 executes on the endpoint device 204 to monitor Application-1 218 and Application-2 220 at the transport layer (Layer 4) and the network layer (Layer 3). In the illustrated example, the monitoring agent 202 (and/or one or more of its components described below in connection with FIG. 4) is separate from the firewall 216, and the monitoring agent 202 does not monitor at the transport layer (Layer 4) and/or the network layer (Layer 3). However, the monitoring agent 202 performs threat monitoring at the data link layer (Layer 2) when the host firewall 216 concurrently performs threat monitoring at the transport layer (Layer 4) and/or the network layer (Layer 3).

Figure 3:
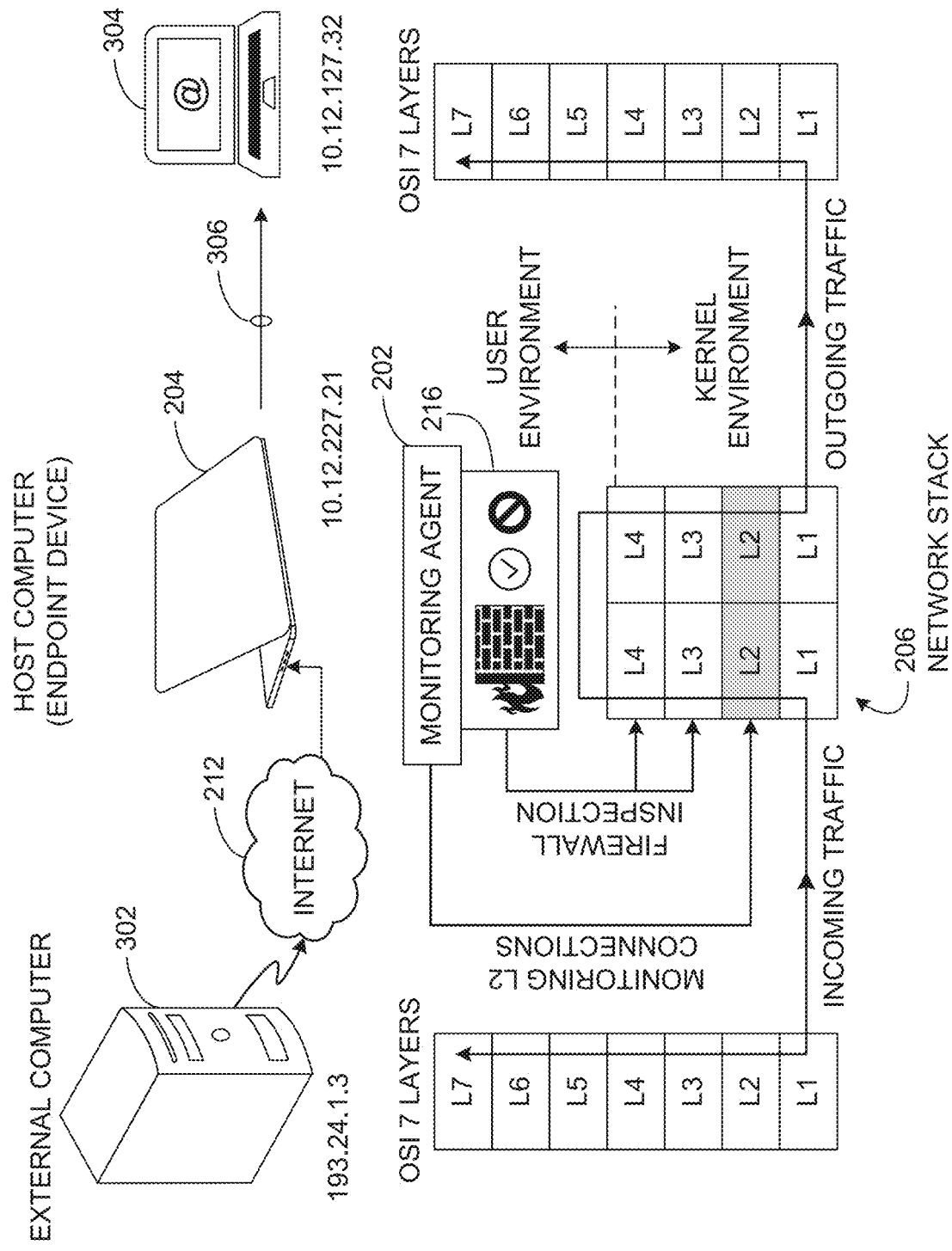
FIG. 3 depicts the example monitoring agent of FIG. 2 executing on the example endpoint device of FIG. 2 that is receiving and sending communications from/to other devices across multiple networks.

FIG. 3 depicts the example monitoring agent 202 of FIG. 2 executing on the example endpoint device 204 of FIG. 2 that is receiving and sending communications from/to other devices 302, 304 across multiple networks. In the illustrated example, the endpoint device 204 is in communication with an external computer 302 (e.g., an external endpoint device such as a server) across the Internet 212 and is in communication with another local endpoint device 304 across a local area network (LAN) 306. The example monitoring agent 202 monitors connection activity at the data link layer (Layer 2) by analyzing communications between the endpoint device 204 and the external computer 302 that flow across the Internet 212, and by analyzing communications between the endpoint device 204 and the local endpoint device 304 that flow across the LAN 306. In this manner, the monitoring agent 202 can detect and/or prevent threats at the data link layer (Layer 2) between multiple devices across multiple networks.

The illustrated example of FIG. 3 shows the seven layers of the OSI model across the external computer 302, the endpoint device 204, and the local endpoint device 304, and shows the host firewall 216 of the endpoint device 204 monitoring at the transport layer (Layer 4) and the network layer (Layer 3). In the illustrated example, Layer 1 through Layer 4 are shown as pertaining to a kernel environment of the network stack 206, and Layer 5 through Layer 7 are shown as pertaining to a user environment of the network stack 206. The host firewall 216 of the illustrated example monitors and controls incoming and outgoing network traffic of the endpoint device 204 based on firewall rules deployed by a network administrator. In the illustrated example, the host firewall 216 performs filtering of the network traffic at the transport layer (Layer 4) and the network layer (Layer 3). However, the host firewall 216 does not filter the network traffic based on other layers of the network stack 206. As such, although the host firewall 216 monitors traffic at the transport layer (Layer 4) and the network layer (Layer 3), if traffic includes connection requests at the data link layer (Layer 2), such traffic will bypass the host firewall 216 without firewall protection monitoring at the data link layer (Layer 2). As such, malicious applications can bypass firewall rules by connecting at the data link layer (Layer 2). Bypassing the host firewall 216 in this manner can open doors for attacks that exploit the data link layer (Layer 2). Example threats at the data link layer (Layer 2) include reverse connection exploit (e.g., zero-day exploit) in which a process establishes a reverse connection from a victim machine to an attacking machine (e.g., executing a malicious application) by connecting at the data link layer (Layer 2) to bypass firewall rules. Such malicious connections can be used to steal user data and/or take control of an endpoint device to perform further malicious processes through the endpoint device under attack. Examples disclosed herein provide improved protections of endpoint devices by detecting malicious processes at the data link layer (Layer 2) and protecting against such threats through remedial actions.

The example monitoring agent 202 disclosed herein provides improved protections for endpoint devices beyond threat protections provided by the host firewall 216 at the transport layer (Layer 4) and/or the network layer (Layer 3). That is, the example monitoring agent 202 strengthens protections across the network stack 206 by extending threat detection and/or prevention to the data link layer (Layer 2) to supplement existing firewall protection capabilities. As discussed above, although the monitoring agent 202 (and/or one or more of its components described below in connection with FIG. 4) is separate from the firewall 216, and the monitoring agent 202 does not monitor at the transport layer (Layer 4) and/or the network layer (Layer 3), the monitoring agent 202 performs threat monitoring at the data link layer (Layer 2) when the host firewall 216 concurrently performs threat monitoring at the transport layer (Layer 4) and/or the network layer (Layer 3). In this manner, examples disclosed herein provide improved endpoint system protection across the network stack 206 by concurrently monitoring for threats at the data link layer (Layer 2) while threat monitoring activities are performed by the firewall 216 at the transport layer (Layer 4), and the network layer (Layer 3).

In the illustrated example of FIG. 3, as communications flow between the endpoint device 204 and the external computer 302 across the Internet 212, and communications flow between the endpoint device 204 and the local endpoint device 304 across the LAN 306, the monitoring agent 202 performs network snooping on the communications. Such network snooping can be based on application verification parameters of ones of the communications corresponding to connections at the data link layer (Layer 2) to detect malicious applications that present threats, as discussed above in connection with FIG. 2. In this manner, in addition to tracking communications from processes of applications (e.g., the Application-5 208 of FIG. 2) executing locally on the host endpoint device 204 as shown in FIG. 2, the monitoring agent 202 can also track communications from processes corresponding to applications of other devices (e.g., the external computer 302 and the local endpoint device 304) in communication with the host endpoint device 204. The example monitoring agent 202 can then generate notifications to prompt a user regarding possible threats and/or can perform one or more responsive actions (e.g., user-selected actions and/or automatic actions) to protect the endpoint device 204 against the possible threats.

Figure 4:
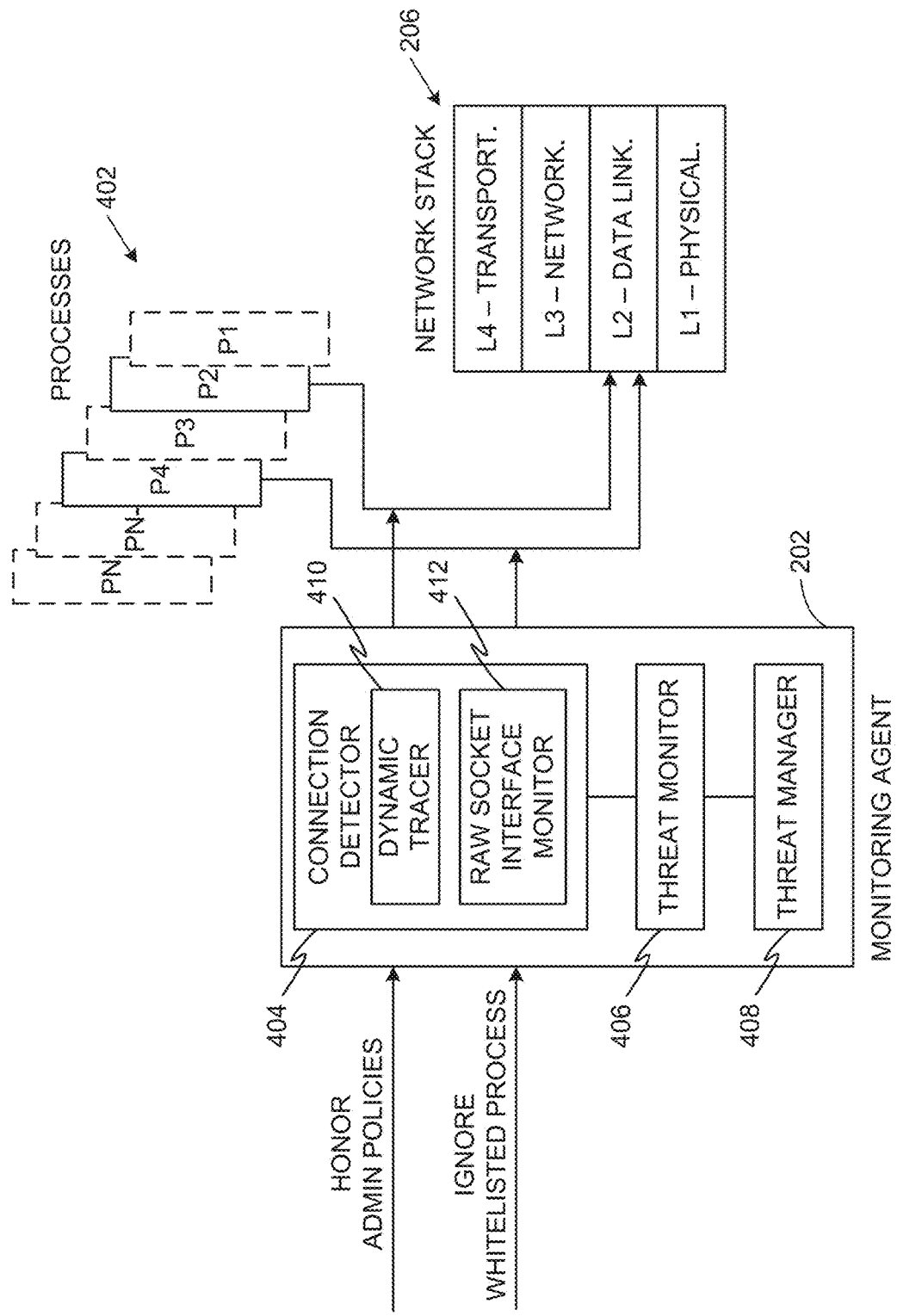
FIG. 4 depicts the example monitoring agent of FIGS. 2 and 3 and example components of the monitoring agent structured to monitor communications at the data link layer (Layer 2) and manage detected threats in one or more of the monitored communications.

FIG. 4 depicts the example monitoring agent 202 of FIGS. 2 and 3 and example components of the monitoring agent 202 structured to monitor processes 402 at the data link layer (Layer 2) and manage detected threats. The example monitoring agent 202 includes an example connection detector 404, an example threat monitor 406, and an example threat manager 408. The example monitoring agent 202 is provided with the connection detector 404 to monitor for particular activities of the processes 402 such as monitoring communications that request connections at the data link layer (Layer 2). There are different ways available for connecting to the data link layer (Layer 2) including issuing file open requests to a /dev/bpf0 character file and/or issuing connection requests through raw socket API calls (e.g., calls made to an API). The file open request to a /dev/bpf0 character file opens access to a character device (e.g., "/dev") at the data link layer (Layer 2) using a bpf raw socket interface. A raw socket API call opens a raw socket connection at the data link layer (Layer 2). Both the file open request to a /dev/bpf0 character file and the raw socket API call enable access to read and/or write packets at the data link layer (Layer 2) which, in turn, enables circumventing firewall rules which monitor at the network layer (Layer 3) and the transport layer (Layer 4). To monitor different types of connection techniques at the data link layer (Layer 2), the example connection detector 404 is provided with an example dynamic tracer 410 and an example raw socket interface monitor 412. The example dynamic tracer 410 may be implemented using one or more operating system APIs for monitoring communications from ones of the processes 402 that issue file open requests to a particular file (e.g., file open requests to a /dev/bpf0 character file using bpf, etc.) that allows connection via the data link layer (Layer 2). The example raw socket interface monitor 412 detects communications from ones of the processes 402 that issue API calls to raw socket APIs to establish data link layer (Layer 2) connections. In other examples, the connection detector 404 may be provided with only one of the dynamic tracer 410 or the raw socket interface monitor 412, and/or the connection detector 404 may be provided with one or more other types of connection request monitors in addition to or instead of one or both of the dynamic tracer 410 or the raw socket interface monitor 412.

The monitoring agent 202 is provided with the example threat monitor 406 to check privilege levels and/or trust levels of applications, and/or to check whether such applications are known to be suspicious or malicious, as described above in connection with FIG. 2. In the illustrated example, the threat monitor 406 performs such analyses when the connection detector 404 detects a process 402 is requesting to connect to the data link layer (Layer 2). In the illustrated example of FIG. 4, the threat monitor 406 also compares application verification parameters of applications against administrator policies to allow connection requests at the data link layer (Layer 2) from applications that are specified in the administrator policies as trusted or allowed. Also in the illustrated example, the threat monitor 406 compares application verification parameters of applications against whitelisted application verification parameters of applications that are specified as allowed to connect at the data link layer (Layer 2). In this manner, the threat monitor 406 can ignore or refrain from monitoring communications from whitelisted applications. In either case, when an administrator policy or a whitelisted application verification parameter specifies that a corresponding application is allowed to connect at the data link layer (Layer 2), the example threat monitor 406 allows the connection from that application. The administrator policies and/or whitelists may be stored locally at the endpoint device 204 and/or they may be stored remotely (e.g., at a policy database in a network connected server or data store) and accessed via network communications.

In the illustrated example, the threat monitor 406 is separate from the firewall 216 (FIGS. 2 and 3) and the threat monitor 406 and the firewall 216 execute on the same endpoint device 204 (FIGS. 2 and 3). In the illustrated example, the threat monitor 406 does not monitor the transport layer (Layer 4) or the network layer (Layer 3) of the OSI model. However, the threat monitor 406 monitors for threats in communications at the data link layer (Layer 2) while the firewall 216 concurrently monitors for threats in communications at the transport layer (Layer 4) and/or the network layer (Layer 3).

The monitoring agent 202 is provided with the example threat manager 408 to perform one or more responsive remedial actions in response to one or more types of detected threats with or without user input after detecting such threat(s), as described above in connection with FIG. 2.

While an example manner of implementing the monitoring agent 202 of FIGS. 2 and 3 is illustrated in FIG. 4, one or more of the elements, processes and/or devices illustrated in FIG. 4 may be combined, divided, re-arranged, omitted, eliminated and/or implemented in any other way. Further, the example connection detector 404, the example threat monitor 406, the example threat manager 408, the example dynamic tracer 410, the example raw socket interface monitor 412, and/or, more generally, the example monitoring agent 202 of FIGS. 2-4 may be implemented by hardware, software, firmware and/or any combination of hardware, software, and/or firmware. Thus, for example, any of the example connection detector 404, the example threat monitor 406, the example threat manager 408, the example dynamic tracer 410, the example raw socket interface monitor 412, and/or, more generally, the example monitoring agent 202 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example connection detector 404, the example threat monitor 406, the example threat manager 408, the example dynamic tracer 410, and/or the example raw socket interface monitor 412 is/are hereby expressly defined to include a non-transitory computer readable storage device or storage disk such as a memory, a digital versatile disk (DVD), a compact disk (CD), a Blu-ray disk, etc. including the software and/or firmware. Further still, the example monitoring agent 202 of FIGS. 2-4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In examples disclosed herein, means for detecting a communication may be implemented by the connection detector 404. In examples disclosed herein, means for determining whether a communication is a threat may be implemented by the threat monitor 406. In examples disclosed herein, the threat manager 408 may implement means for managing a threat. In examples disclosed herein, the dynamic tracer 410 may implement means for detecting a request to open a file. In examples disclosed herein, the raw socket interface monitor 412 may implement means for detecting an application programming interface call.

Figure 5:
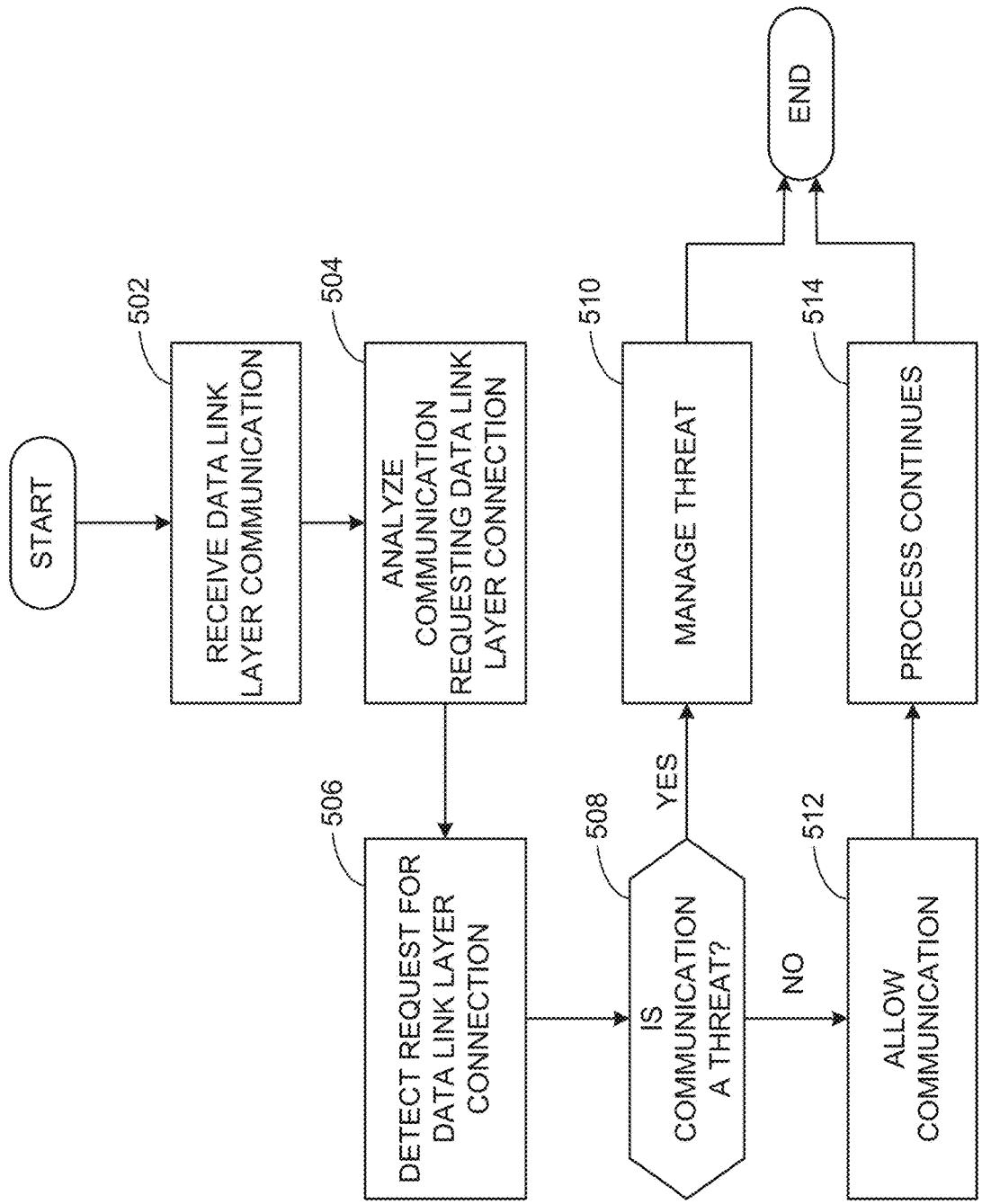
FIG. 5 is a flowchart representative of machine readable instructions which may be executed to implement the example monitoring agent of FIGS. 2-4 to monitor communications at the data link layer (Layer 2) and manage detected threats in one or more of the monitored communications.

A flowchart representative of example hardware logic, machine readable instructions, hardware implemented state machines, and/or any combination thereof for implementing the monitoring agent 202 of FIGS. 2-4 is shown in FIG. 5. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example monitoring agent 202 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, field programmable gate array (FPGA), an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an API, etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 5 is a flowchart representative of machine readable instructions which may be executed to implement the example monitoring agent 202 of FIGS. 2-4 to monitor communications from processes at the data link layer (Layer 2) and manage detected threats in one or more of the monitored communications. The example process of FIG. 5 begins at block 502 at which the example connection detector 404 (FIG. 4) receives a communication at a data link layer (Layer 2) of the OSI model. The example connection detector 404 analyzes the data link layer (Layer 2) communication (block 504) to determine whether it is a request for a connection to the endpoint device 204 (FIGS. 2 and 3) at the data link layer (Layer 2). For example, the connection detector 404 monitors communications at the data link layer (Layer 2) from applications (e.g., the Application-5 208 of FIG. 2 and/or applications on the external computer 302 and/or the local endpoint device 304 of FIG. 3) to detect requests to establish data link layer (Layer 2) connections in the endpoint device 204. To detect such connection requests, the example connection detector 404 may employ the dynamic tracer 410 and/or the raw socket interface monitor 412 using techniques described above. For example, the connection detector 404 may employ the dynamic tracer 410 by using one or more operating system APIs to monitor communications from ones of the processes 402 (FIG. 4) that issue file open requests to a particular file (e.g., file open requests to a /dev/bpf0 character file using bpf, etc.) which allows connection via the data link layer (Layer 2). Additionally or alternatively, the connection detector 404 employs the example raw socket interface monitor 412 to detect communications from ones of the processes 402 that call raw socket APIs to connect to the data link layer (Layer 2).

At block 506, the example connection detector 404 detects the communication as including a request to connect to the endpoint device 204 at the data link layer (Layer 2) of the OSI model. The example threat monitor 406 determines whether the communication is a threat (block 508). For example, the threat monitor 406 checks privilege levels and/or trust levels of an application corresponding to the communication, and/or checks whether the application is known to be suspicious or malicious, as described above in connection with FIG. 2. In some examples, the threat monitor 406 additionally or alternatively checks whether the application is identified as a whitelisted application and/or is identified in an administrator policy as being allowed to connect at the data link layer (Layer 2). If the threat monitor 406 does not find the application is whitelisted or allowed based on an administrator policy, and/or the threat monitor 406 determines that the application does not have a sufficient privilege level and/or trust level, and/or the threat monitor 406 determines that the application is identified as a suspicious or malicious application, the threat monitor 406 confirms that the communication is a threat. In such instances, the threat may be a potential threat that the monitoring agent 202 treats as a threat to prevent malicious activity on the endpoint device 204.

If the threat monitor 406 determines at block 508 that the communication is a threat, the example threat manager 408 manages the threat (block 510) by generating a notification to prompt a user (e.g., a network administrator) about the threat and/or blocking the communication. The threat manager 408 may perform one or more responsive actions in response to the detected threat in an automatic manner and/or a user-driven manner as described above. Otherwise, if the threat monitor determines at block 508 that the communication is not a threat, the example threat manager 408 allows the communication (block 512). A corresponding one of the processes 402 that issued the communication is allowed by the threat manager 408 to continue (block 514) because it did not present a threat. After managing the threat at block 510 or after the process 402 continues at block 514, the example process of FIG. 5 ends.

Figure 6:
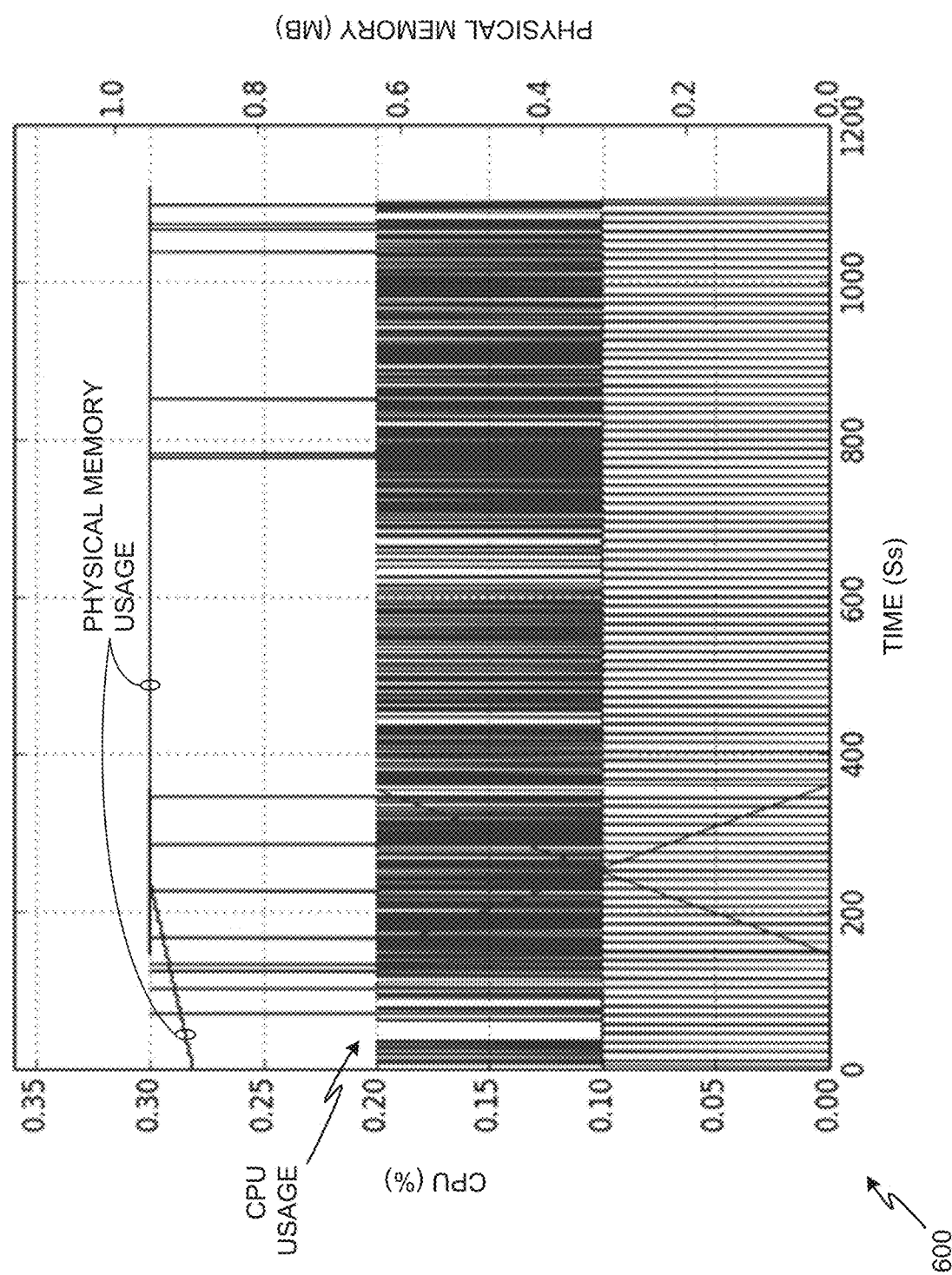
FIG. 6 is an example computing performance chart showing test results of processor performance and physical memory performance of the monitoring agent of FIGS. 2-4 running on an endpoint device to monitor communications at the data link layer (Layer 2) and manage detected threats in one or more of the monitored communications.

FIG. 6 is an example computing performance chart 600 showing test results of CPU (central processing unit) performance and physical memory performance of the monitoring agent 202 (FIGS. 2-4) running on the endpoint device 204 (FIGS. 2 and 3) over time to monitor communications at the data link layer (Layer 2) and manage detected threats in one or more of the monitored communications. The example computing performance chart 600 shows that the monitoring agent 202 has no significant impact on network throughput of the endpoint device 204. For example, the CPU and physical memory usage of the monitoring agent 202 is relatively low, as shown in FIG. 6, to allow maintaining substantially high CPU and memory performance of the endpoint device 204. For example, in FIG. 6, the monitoring agent 202 consumes between 0% and 0.30% of CPU resources and uses between 0.9 and 1.0 megabytes (MB) of physical memory (e.g., random access memory (RAM)) of the endpoint device 204 during operation. Such substantially low CPU and memory usage is due to the monitoring agent 202 not performing deep packet inspection to carry out its data link layer (Layer 2) threat monitoring activities.

Figure 7:
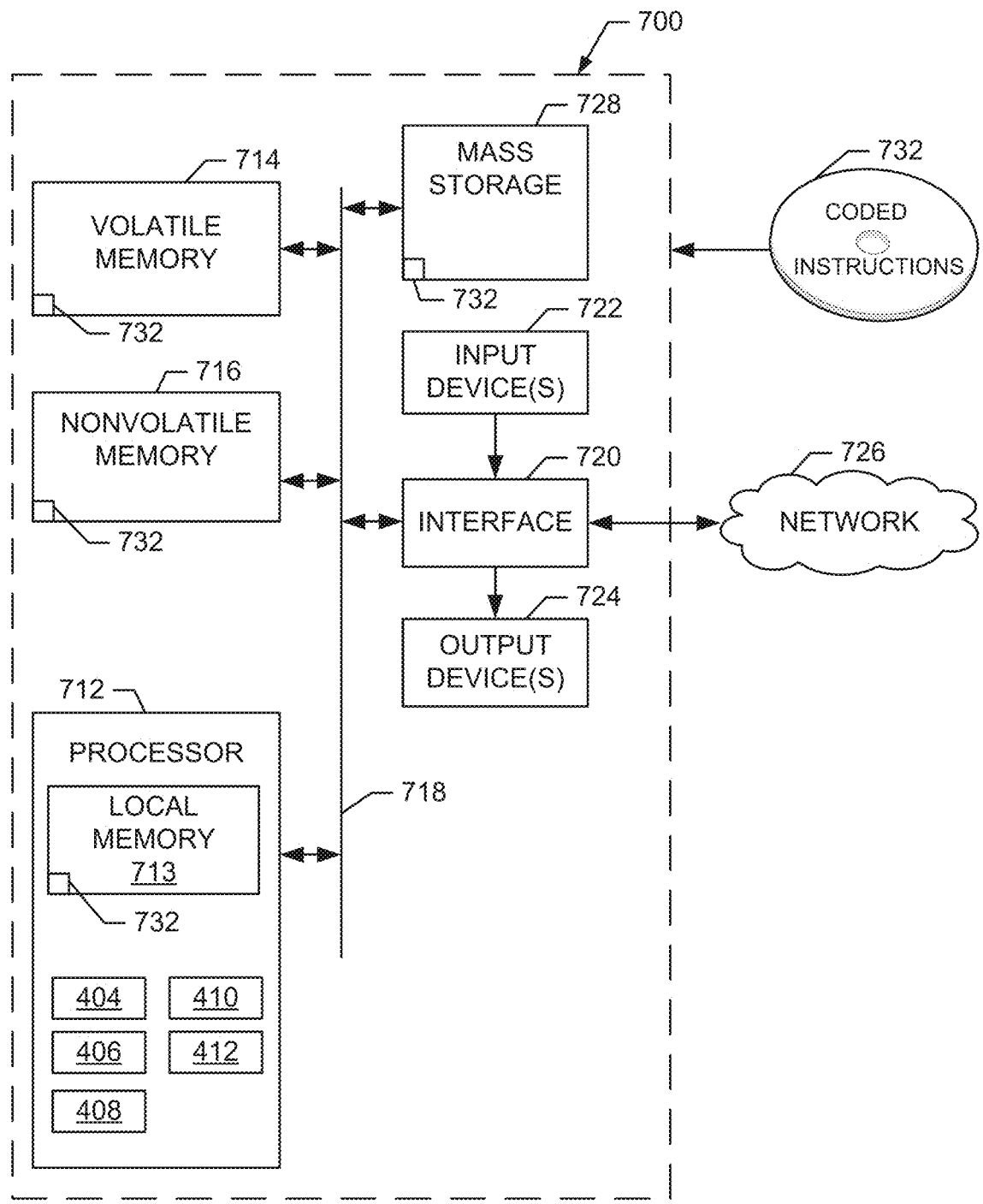
FIG. 7 is a block diagram of an example processing platform structured to execute the instructions of FIG. 5 to implement the example monitoring agent of FIGS. 2-4 to monitor communications at the data link layer (Layer 2) and manage detected threats in one or more of the monitored communications.

FIG. 7 is a block diagram of an example processor platform 700 structured to execute the instructions of FIG. 5 to implement the monitoring agent 202 of FIGS. 2-4. The processor platform 700 can be, for example, a server, a personal computer, a workstation, a self-learning machine (e.g., a neural network), a mobile device (e.g., a cell phone, a smart phone, a tablet such as an iPad™ computing tablet device), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the connection detector 404, the threat monitor 406, the threat manager 408, the dynamic tracer 410, and the raw socket interface monitor 412.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

Example machine executable instructions 732 represented by the example flowchart of FIG. 5 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that detect and prevent attacks that bypass host firewall protections by connecting and communicating via a data link layer (Layer 2) of an OSI model. The disclosed methods, apparatus and articles of manufacture improve the efficiency of using a computing device by employing a disclosed monitoring agent to detect threats and prevent attacks at the data link layer (Layer 2) without significantly impacting processor performance and/or memory performance of a host endpoint device that executes the disclosed monitoring agent. For example, instead of performing deep packet inspection of communication at the data link layer (Layer 2), the disclosed monitoring agent checking privilege and/or trust levels of applications, and/or based on checking whether such applications are known to be suspicious or malicious, and/or checking whether the application is identified as a whitelisted application and/or is identified in an administrator policy as being allowed to connect at the data link layer (Layer 2). Since such monitoring is based on application verification parameters of applications, examples disclosed herein do not necessitate deep packet inspection which could significantly decrease performance of the endpoint device by needing to buffer data packets and analyze payloads of such data packets for potential threats. Examples disclosed herein improve endpoint device security by extending threat detection and/or prevention to the data link layer (Layer 2) to supplement existing firewall protection capabilities that operate at the transport layer (Layer 4) and the network layer (Layer 3). As such, using the disclosed monitoring agent in combination with a firewall provides concurrent endpoint device security across the transport layer (Layer 4), the network layer (Layer 3), and the data link layer (Layer 2). The disclosed methods, apparatus and articles of manufacture are accordingly directed to one or more improvement(s) in the functioning of a computer.

Example methods, apparatus, systems, and articles of manufacture to detect and prevent attacks that bypass host firewall protections by connecting and communicating via a data link layer (Layer 2) of an OSI model are disclosed herein. Further examples and combinations thereof include the following:

Example 1 is an apparatus. The apparatus of Example 1 includes a connection detector to detect a communication as including a request to connect to a device at a data link layer of an Open Systems Interconnection model; a threat monitor to determine whether the communication is a threat; and a threat manager to, when the threat monitor detects the communication as a threat, at least one of generate a notification to prompt a user about the threat or block the communication.

Example 2 includes the subject matter of Example 1 and optionally includes that the connection detector is to detect the communication as including the request to connect to the device at the data link layer based on at least one of (a) using a dynamic tracer to detect a request to open a file, or (b) using a raw socket interface monitor to detect an application programming interface call to establish a data link layer connection.

Example 3 includes the subject matter of any one or more of Examples 1-2 and optionally includes that the threat monitor is to determine whether the communication is a threat without performing a deep packet inspection on the communication.

Example 4 includes the subject matter of any one or more of Examples 1-3 and optionally includes that the threat monitor is to be separate from a firewall, the threat monitor and the firewall to execute on the device.

Example 5 includes the subject matter of any one or more of Examples 1-4 and optionally includes that the threat monitor does not monitor a transport layer or a network layer of the Open Systems Interconnection model.

Example 6 includes the subject matter of any one or more of Examples 1-5 and optionally includes that the threat monitor is to monitor the data link layer when a firewall concurrently monitors at least one of a transport layer or a network layer of the Open Systems Interconnection model.

Example 7 includes the subject matter of any one or more of Examples 1-6 and optionally includes that when the threat manager is to block the communication, the threat manager is to block the communication without user input after the threat monitor detects the threat.

Example 8 is a non-transitory computer readable storage medium comprising instructions that, when executed by a processor, cause the processor to at least detect a communication as including a request to connect to a device at a data link layer of an Open Systems Interconnection model; determine whether the communication is a threat; and when the communication is a threat, at least one of generate a notification to prompt a user about the threat or block the communication.

Example 9 includes the subject matter of Example 8 and optionally includes that the instructions cause the processor to detect the communication as including the request to connect to the device at the data link layer based on at least one of (a) detecting a request to open a file, or (b) detecting an application programming interface call to establish a data link layer connection.

Example 10 includes the subject matter of any one or more of Examples 8-9 and optionally includes that the instructions are to cause the processor to determine whether the communication is a threat without performing a deep packet inspection on the communication.

Example 11 includes the subject matter of any one or more of Examples 8-10 and optionally includes that the instructions are to cause the processor to determine whether the communication is a threat separate from a firewall.

Example 12 includes the subject matter of any one or more of Examples 8-11 and optionally includes that the instructions are to cause the processor to determine whether the communication is a threat without monitoring a transport layer or a network layer of the Open Systems Interconnection model.

Example 13 includes the subject matter of any one or more of Examples 8-12 and optionally includes that the instructions are to cause the processor to monitor the data link layer when a firewall concurrently monitors at least one of a transport layer or a network layer of the Open Systems Interconnection model.

Example 14 includes the subject matter of any one or more of Examples 8-13 and optionally includes that when the instructions are to cause the processor to block the communication, the instructions are to cause the processor to block the communication without user input after the threat monitor detects the threat.

Example 15 is a method. The method of Example 15 includes detecting a communication as including a request to connect to a device at a data link layer of an Open Systems Interconnection model; determining whether the communication is a threat; and when the communication is a threat, at least one of generating a notification to prompt a user about the threat or blocking the communication.

Example 16 includes the subject matter of Example 15 and optionally includes that the detecting of the communication as including the request to connect to the device at the data link layer is based on at least one of (a) detecting a request to open a file, or (b) detecting an application programming interface call to establish a data link layer connection.

Example 17 includes the subject matter of any one or more of Examples 15-16 and optionally includes that the determining of whether the communication is a threat is performed without performing a deep packet inspection on the communication.

Example 18 includes the subject matter of any one or more of Examples 15-17 and optionally includes that the determining of whether the communication is a threat is performed separate from a firewall.

Example 19 includes the subject matter of any one or more of Examples 15-18 and optionally includes that the determining of whether the communication is a threat is performed without monitoring a transport layer or a network layer of the Open Systems Interconnection model.

Example 20 includes the subject matter of any one or more of Examples 15-19 and further includes monitoring the data link layer when a firewall concurrently monitors at least one of a transport layer or a network layer of the Open Systems Interconnection model.

Example 21 includes the subject matter of any one or more of Examples 15-20 and optionally includes that the blocking of the communication includes blocking the communication without user input after the threat monitor detects the threat.

Example 22 is an apparatus. The apparatus of Example 22 includes means for detecting a communication as including a request to connect to a device at a data link layer of an Open Systems Interconnection model; means for determining whether the communication is a threat; and means for managing a threat to, when the communication as a threat, at least one of generate a notification to prompt a user about the threat or block the communication.

Example 23 includes the subject matter of Example 22 and optionally includes that the means for detecting the communication is to detect the communication as including the request to connect to the device at the data link layer based on at least one of (a) using a means for detecting a request to open a file, or (b) using a means for detecting an application programming interface call to establish a data link layer connection.

Example 24 includes the subject matter of any one or more of Examples 22-23 and optionally includes that the means for determining whether the communication is a threat is to determine whether the communication is a threat without performing a deep packet inspection on the communication.

Example 25 includes the subject matter of any one or more of Examples 22-24 and optionally includes that the means for determining whether the communication is a threat is to determine whether the communication is a threat separate from a firewall.

Example 26 includes the subject matter of any one or more of Examples 22-25 and optionally includes that the means for determining whether the communication is a threat does not monitor a transport layer or a network layer of the Open Systems Interconnection model.

Example 27 includes the subject matter of any one or more of Examples 22-26 and optionally includes that the means for determining whether the communication is a threat is to monitor the data link layer when a firewall concurrently monitors at least one of a transport layer or a network layer of the Open Systems Interconnection model.

Example 28 includes the subject matter of any one or more of Examples 22-27 and optionally includes that the means for managing a threat is to block the communication without user input after detection of the threat.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements, or method actions may be implemented by, for example, a single unit or processor. Additionally, although individual features may be included in different examples or claims, these may possibly be combined, and the inclusion in different examples or claims does not imply that a combination of features is not feasible and/or advantageous.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a connection detector to detect a communication as including a request to connect to a device at a data link layer of an Open Systems Interconnection model;
   a threat monitor to determine whether the communication is a threat; and
   a threat manager to, when the threat monitor determines the communication is a threat, at least one of generate a notification to prompt a user about the threat or block the communication.

2. The apparatus as defined in claim 1, wherein the connection detector is to detect the communication as including the request to connect to the device at the data link layer based on at least one of: (a) using a dynamic tracer to detect a request to open a file, or (b) using a raw socket interface monitor to detect an application programming interface call to establish a data link layer connection.

3. The apparatus as defined in claim 1, wherein the threat monitor is to determine whether the communication is a threat without performing a deep packet inspection on the communication.

4. The apparatus as defined in claim 1, wherein the threat monitor is to be separate from a firewall, the threat monitor and the firewall to execute on the device.

5. The apparatus as defined in claim 1, wherein the threat monitor does not monitor a transport layer or a network layer of the Open Systems Interconnection model.

6. The apparatus as defined in claim 1, wherein the threat monitor is to monitor the data link layer when a firewall concurrently monitors at least one of a transport layer or a network layer of the Open Systems Interconnection model.

7. The apparatus as defined in claim 1, wherein when the threat manager is to block the communication, the threat manager is to block the communication without user input after the threat monitor determines the communication is a threat.

8. A non-transitory computer readable storage medium comprising instructions that, when executed by a processor, cause the processor to at least:
   detect a communication as including a request to connect to a device at a data link layer of an Open Systems Interconnection model;
   determine whether the communication is a threat; and
   when the communication is a threat, at least one of generate a notification to prompt a user about the threat or block the communication.

9. The non-transitory computer readable storage medium as defined in claim 8, wherein the instructions are to cause the processor to detect the communication as including the request to connect to the device at the data link layer based on at least one of: (a) detecting a request to open a file, or (b) detecting an application programming interface call to establish a data link layer connection.

10. The non-transitory computer readable storage medium as defined in claim 8, wherein the instructions are to cause the processor to determine whether the communication is a threat without performing a deep packet inspection on the communication.

11. The non-transitory computer readable storage medium as defined in claim 8, wherein the instructions are to cause the processor to determine whether the communication is a threat separate from a firewall.

12. The non-transitory computer readable storage medium as defined in claim 8, wherein the instructions are to cause the processor to determine whether the communication is a threat without monitoring a transport layer or a network layer of the Open Systems Interconnection model.

13. The non-transitory computer readable storage medium as defined in claim 8, wherein the instructions are to cause the processor to monitor the data link layer when a firewall concurrently monitors at least one of a transport layer or a network layer of the Open Systems Interconnection model.

14. The non-transitory computer readable storage medium as defined in claim 8, wherein when the instructions are to cause the processor to block the communication, the instructions are to cause the processor to block the communication without user input after determining the communication is a threat.

15. A method comprising:
   detecting a communication as including a request to connect to a device at a data link layer of an Open Systems Interconnection model;
   determining whether the communication is a threat; and
   when the communication is a threat, at least one of generating a notification to prompt a user about the threat or blocking the communication.

16. The method as defined in claim 15, wherein the detecting of the communication as including the request to connect to the device at the data link layer is based on at least one of: (a) detecting a request to open a file, or (b) detecting an application programming interface call to establish a data link layer connection.

17. The method as defined in claim 15, wherein the determining of whether the communication is a threat is performed without performing a deep packet inspection on the communication.

18. The method as defined in claim 15, wherein the determining of whether the communication is a threat is performed separate from a firewall.

19. The method as defined in claim 15, wherein the determining of whether the communication is a threat is performed without monitoring a transport layer or a network layer of the Open Systems Interconnection model.

20. The method as defined in claim 15, further including monitoring the data link layer when a firewall concurrently monitors at least one of a transport layer or a network layer of the Open Systems Interconnection model.

\* \* \* \* \*